United States Patent [19]

Glass

[11] Patent Number: 5,023,745
[45] Date of Patent: Jun. 11, 1991

[54] SURGE ARRESTOR APPARATUS AND METHOD

[75] Inventor: John C. Glass, Streetsboro, Ohio

[73] Assignee: Erico International Corporation, Solon, Ohio

[21] Appl. No.: 403,366

[22] Filed: Sep. 6, 1989

[51] Int. Cl.$^5$ ............................................... H02H 9/04
[52] U.S. Cl. ........................................ 361/56; 361/91; 361/127
[58] Field of Search ...................... 361/56, 58, 91, 107, 361/111, 117, 120, 126, 127, 128, 331, 335

[56] References Cited

U.S. PATENT DOCUMENTS 3,987,343 10/1976 Cunningham et al. ............. 361/127
4,635,160 1/1987 Riley .................................. 361/111

OTHER PUBLICATIONS

Safetran, Surge Protection, Section H.
Harmon, Total Lightning Arrestor System.
Exemplary Conventional Surge Arresting Apparatus.
Glass, Improved Bungalow Protection Using Modern Bonding and Grounding.
MIL-HDBK-419 A, Military Handbook, *Grounding of Signal Reference Subsystem*, Jan. 21, 1982.
Dwight *Skin Effect in Tubular and Flat Conductors* Trans. AIEE, vol. 37, pp. 1379–1418, 1918.
Capitini, *Data Center Employs Comprehensive Computer Grounding Scheme*, EC&M, 3/1989.
Switzer, *Protecting Data with Proper Grounding* Enrico Products, Inc. 2/1989.
Erico Products, Inc. Cadweld® Signal Reference Grids and Computer Room Grounding, 8/1988.

*Primary Examiner*—Todd E. Deboer
*Attorney, Agent, or Firm*—Renner, Otto, Boisselle & Sklar

[57] ABSTRACT

Surge arrestor assemblies for railroad and like circuits utilize a high surface area to cross-sectional area, broadband equal potential grounding plane which is in the form of a loop. Surges are electrically coupled to the broadband equipotential grounding plane through surge arrestors. The assembly ensures that each arrestor "see's" the same impedance so that the voltage seen at the equipment is controlled. The grounding member is supported in recesses in mounting blocks which maintain its planar condition, and which also facilitate the connections to ground, lines, arresters and equipment.

25 Claims, 5 Drawing Sheets

SURGE ARRESTOR APPARATUS AND METHOD

TECHNICAL FIELD OF THE INVENTION

This invention relates to electric over-voltage and surge protection, and more specifically, to voltage surge protection of electrical circuits such as those used in railroad and other applications.

BACKGROUND OF THE INVENTION

Voltage excursions are frequently encountered which may damage or destroy sensitive electronic equipment and components. Examples of these voltage excursions are, but not limited to, electrical surges, voltage transients, over voltages, lightning energy, induced voltages, current surges, switching transients, etc. These will be referred to generally as electrical surges.

In a railroad installation which contains electrical equipment, such as a signal bungalow or case, it is a common practice to protect critical electrical control circuits such as those controlling the track signals from electrical surges. These surges may be attributable to lightning or other known or unanticipated sources which create an unusually high voltage on the circuit. Surge protection is important because high voltage surges may destroy electrical components or contribute excessive electrical noise to a circuit causing it to malfunction or otherwise perform unpredictably.

To prevent damage from electrical surges, over-voltage or lightning arrestors are used to couple the energy from the circuit to ground when an electrical voltage surge is detected on the circuit exceeding a predetermined voltage with respect to a reference point. This effectively bleeds the energy of the electrical surge to ground and protects the sensitive electrical circuit components. Currently, when it is necessary to protect more than one circuit, a surge arresting device is coupled to each circuit and attached to a ground bus. There may be several devices employed in this manner. The ground bus is then connected to an outside reference ground.

While these configurations have provided some protection, it has been found that due to impedances of the ground lead some of the arrestors (particularly those farthest from the connection to the reference ground) would see a higher impedance.

Consequently, instead of an arrester coupling most of the energy of the electrical surge to ground, the line potential will be much higher due to the inductance of the ground lead. When additional arresters are used the voltage difference between two lines will be mainly determined by the difference in the impedance of their ground leads. If this difference is large, the potential voltage between the two lines may result in damage to or malfunctioning of sensitive electronic equipment and components.

The deleterious effects of electrical voltage surges are especially troublesome at high frequencies. This is because the impedance of the ground path is a function of not only resistance, but also inductance and capacitance. At relatively low frequencies, such as 60 hertz, the impedance is sometimes due primarily to the dc resistance. Conversely, at high frequencies, such as 30 megahertz, the inherent inductance and capacitance of the ground path may elevate the impedance to such a degree that the path is essentially open. In this case the impedance to ground apparent to the arrestor might be so high that it would not couple the electrical surge to ground and instead it would be conducted to the circuit sought to be protected.

It is desirable to provide a surge arrestor assembly in which all the arrestors in the assembly see the same low impedance to ground, and wherein the assembly is effective at high frequencies as well as at low frequencies.

SUMMARY OF THE INVENTION

The present invention provides an equipotential plane through which all surge arrestors are provided with an equal potential ground reference point. The equipotential plane provides an effective low impedance between the arresters and ground as well as between any of the arresters which are connected to ground for both high and low frequency electrical surges. This ensures that each arrestor will protect the line at its rated design voltage. Also included is an improved mounting block facilitating a low impedance ground path from the surge arrestors to the equipotential plane and an arrangement of the components to prevent electrical discharge or electrical isolation between adjacent components.

In accordance with the present invention, a device for grounding an electrical surge in a circuit used in a railroad track circuit application, includes a grounding member having a high surface to cross-sectional area ratio for facilitating the low impedance conductance of high frequency electrical energy; a plurality of conductors for the conductance of electrical signals from a power source to a load; and, a plurality of surge arrestors electrically connected to the conductors and the grounding member for grounding any of such electrical signals to the grounding member when any of such signals exceeds a predetermined voltage.

In accordance with another aspect of the invention, a device for grounding surges of electrical energy in circuits used in a railroad track circuit application, includes a continuous conductive loop having a substantially equal impedance to ground at all points on the loop; a plurality of conductors for the conductance of electrical signals from at least one power source to a plurality of loads; and, a plurality of surge arrestors electrically connected to the conductors and the continuous conductive loop for grounding any of such electrical signals to the loop when any of such signals exceeds a predetermined voltage.

According to a further aspect, a method of grounding a surge of electrical energy in railroad track circuits, includes the steps of tapping such electrical signal conducted through a circuit; electrically coupling such electrical signal to a grounding path when the potential difference between such electrical signal and ground exceeds a predetermined voltage; and, conducting such electrical signal to ground along a grounding path having a high surface to cross-sectional area ratio for facilitating the low impedance conductance of high frequency electrical energy.

According to still another aspect of the present invention, a mounting block assembly for conductive elements in a railroad track circuit surge arrestor sub-assembly, includes a plurality of highly insulative mounting blocks, each including a flat recess in the top surface for orienting a flat grounding member, a cavity in the bottom surface for containing conductive elements, and a plurality of recesses maintaining a sufficient air gap between conductive elements mounted therein to prevent electrical discharge between such elements.

According to yet another aspect, in electrical circuits, a low impedance equipotential grounding plane conductor supported in a recess in a plurality of mounting blocks with a surface exposed for mounting surge arrestors thereto each at a fixed distance with respect to said equipotential plane.

These and other objects, advantages, features and aspects of the present invention will become apparent as the following description proceeds.

To the accomplishment of the foregoing and related ends, the invention, then, comprises and features hereinafter fully described in the specification and particularly pointed out in the claims, the following description and the annexed drawings setting forth in detail a certain illustrative embodiment of the invention, this being indicative, however, of but one of the various ways in which the principles of the invention may be employed. It will be appreciated that the scope of the invention is to be determined by the claims and the equivalents thereof.

DETAILED DESCRIPTION OF THE INVENTION

Figure 1:
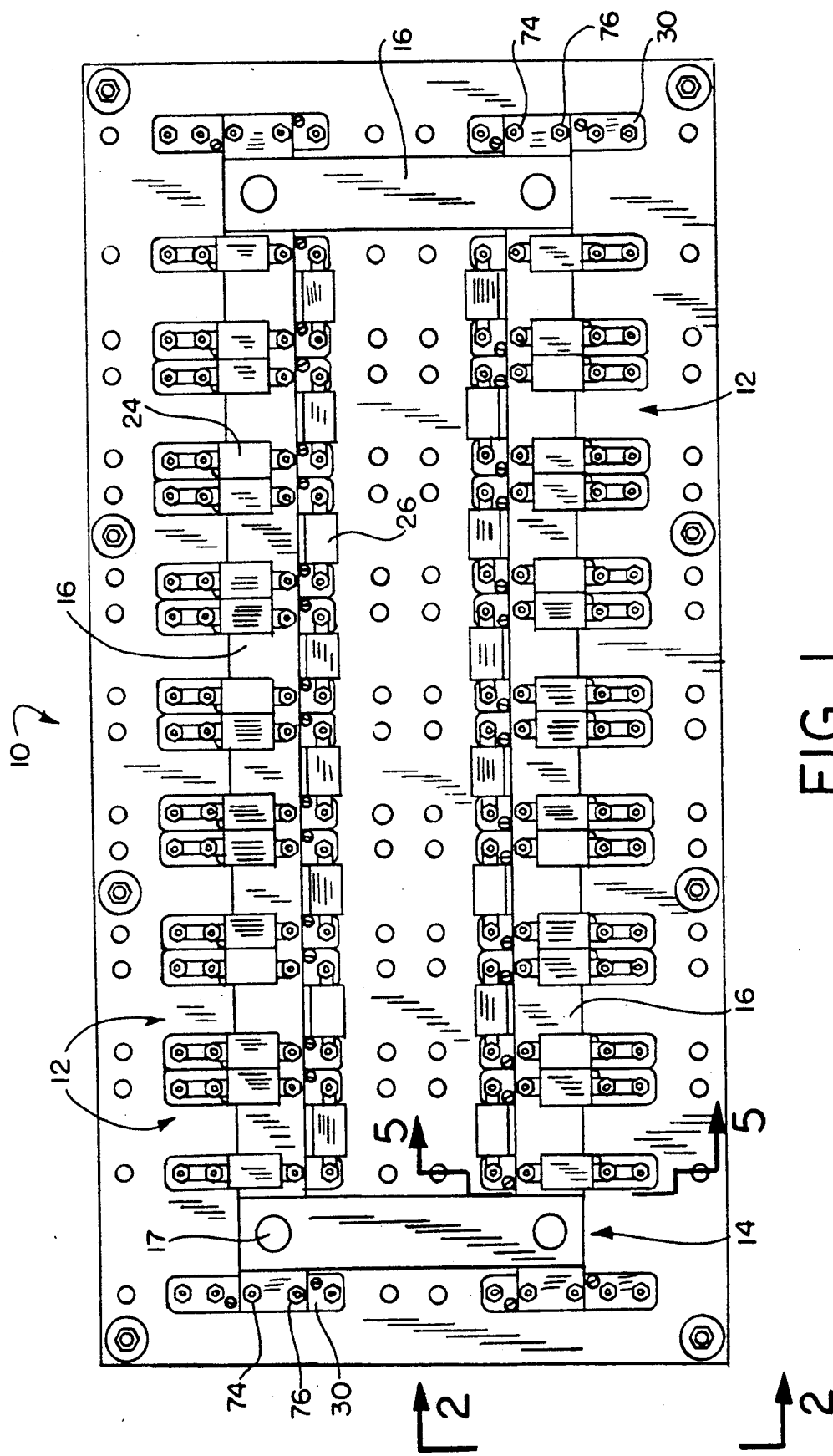
FIG. 1 is an illustration of a surge arresting assembly in accordance with the present invention.

With reference to the several figures, and initially to FIG. 1, there is shown a surge arresting assembly 10 in accordance with the present invention. The surge arresting assembly 10 includes a number of surge arresting sub-assemblies 12 arranged around an rectangular grounding plane 14. Each surge arresting sub-assembly 12 provides surge protection for an individual circuit. Typically each sub-assembly couples input signals, such as those from a power supply to a circuit for use in controlling track signals, train crossings, etc. In the event that a sub-assembly 12 is subject to an electrical surge on a line exceeding a predetermined potential above ground, it will couple the circuit to the grounding plane 14, thus routing the electrical surge to a ground and thus protecting the circuit.

The grounding plane includes four conductive members 16 arranged in a generally rectangular loop configuration. The members 16 are preferably copper, or another good electrical conductor, and are joined near their ends in a low impedance electrical connection 17, such as that formed by a welded process. The grounding plane 14 is coupled to an outside reference ground at multiple convenient points on the plane as hereinafter described.

The continuously conductive loop 14 formed by the interconnecting grounding path members 16 acts to maintain the equipotential plane at essentially the same electrical potential at all places on the loop thus providing multiple grounding paths for all frequencies up to the resonant frequency of the loop. Consequently, the surge sub-assemblies 12 are all coupled to the same ground reference regardless of their placement on the grounding loop 14, and it can be assured that they will couple a surge to ground at essentially the same known level.

The dimensions of the rectangular grounding plane 14 and the number of surge arresting sub-assemblies 12 connected to it are determined by the size of the application and the loop resonant frequency. It is preferable, however, that the grounding plane 14 be as small as is possible while accommodating all the surge arresting sub-assemblies 12. In any case, the maximum size of the grounding plane 14 should not exceed approximately three feet long by the minimum distance possible between the two longer members of the loop. This is due to resonance effects inherently present in a conductor when subject to certain transient events. The effect of resonance elevates the impedance of the conductor to such a level that it may operate as a open circuit. In general as the length of the conductor increases, the first frequency at which it will resonate decreases. It has been found that a 33 inch length of conductor resonates at a frequency sufficiently high that it will not interfere with the frequencies likely to be present in most applications.

In the event that more circuits need be protected than can be accommodated by given rectangular grounding plane, multiple grounding planes may be configured as a matrix with the grounding planes occupying common sides. As many grounding planes and surge arresting devices may be arranged in this way as is necessary, although additional reference ground connections may be needed to maintain an equal potential ground throughout the matrix.

The grounding plane members 16 have a flat cross-section such that their surface areas are maximized while still maintaining a relatively rigid structure. In the preferred embodiment the members 16 are approximately 2 inches wide and 0.062 inches thick (a ratio of about 1 to 0.031 or 30 to 1). The advantage of the high surface area conductor is that the inductance and capacitance per unit of length is minimized while still having the same resistance value. This is important because, as stated above, the impedance of a conductor includes inductance and capacitance as well as resistance. Since the impedance contributed by inductance and capacitance is directly a function of the frequency of the conducted signal; as the frequency increases, so does the impedance. For high frequency signals the inductance and capacitance contributions may elevate the impedance so high as to act as an open connection to ground and prevent grounding of a high frequency electrical surge. By employing a flat high surface area grounding plane 14 the inductance and capacitance is minimized thus allowing the effective grounding of both low and high frequency electrical surges.

In the following description, the connections from the surge arrestor sub-assemblies 12 to the power supply or other input/output sources coming physically from the outside of the signal case or bungalow will be referred to as the line connections or the line side 18 is of the sub-assembly. Conversely, electrical connections inside the signal case or bungalow will be referred to as the equipment connections or the equipment side 19 of the sub-assembly.

Figure 2:
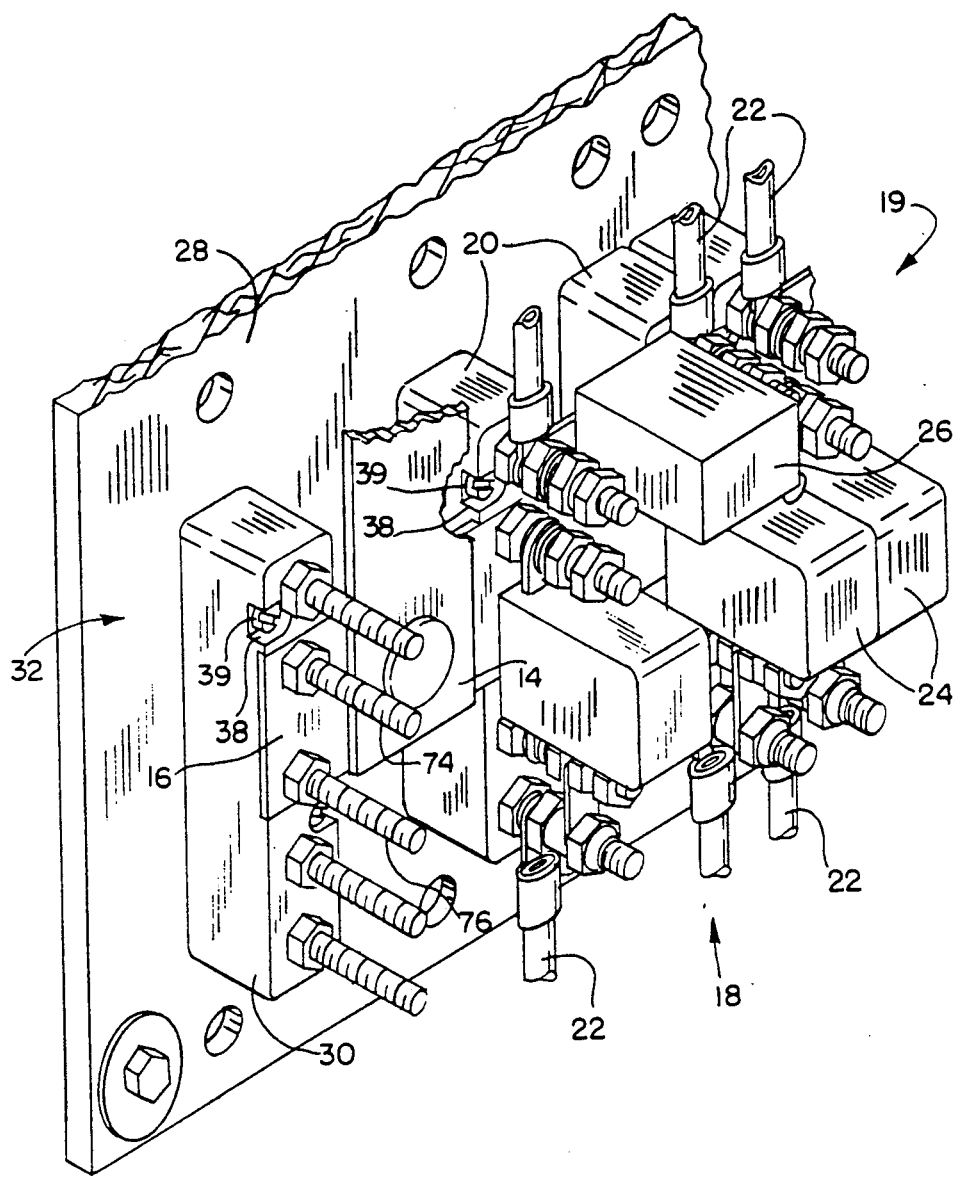
FIG. 2 is an isometric view of a corner of the apparatus shown in FIG. 1.

Each surge arresting sub-assembly 12 oriented around the grounding plane 14 may include two parallel mounting blocks 20 for maintaining the circuit lines 22, the grounding plane 14, and the surge arrestors, 24, 26 in fixed relation, as shown in FIG. 2. The surge arrestors 24 provides line-to-ground protection for the circuit lines 22, while surge arrestor 26 provides line-to-line protection for the circuit lines. However, in some applications the line-to-line arrester 26 may not be necessary. Each mounting block 20 accommodates one line of the protected circuit and affixes the components associated with that line to a rigid back plate 28, such as a sheet of plywood in the bungalow or case. An end block 30, preferably identical to a mounting block 20, is employed at each corner 32 of the ground plane 14 to secure the ground plane to the back plate 28 and improve rigidity of the ground plane.

Figures 3, 4:
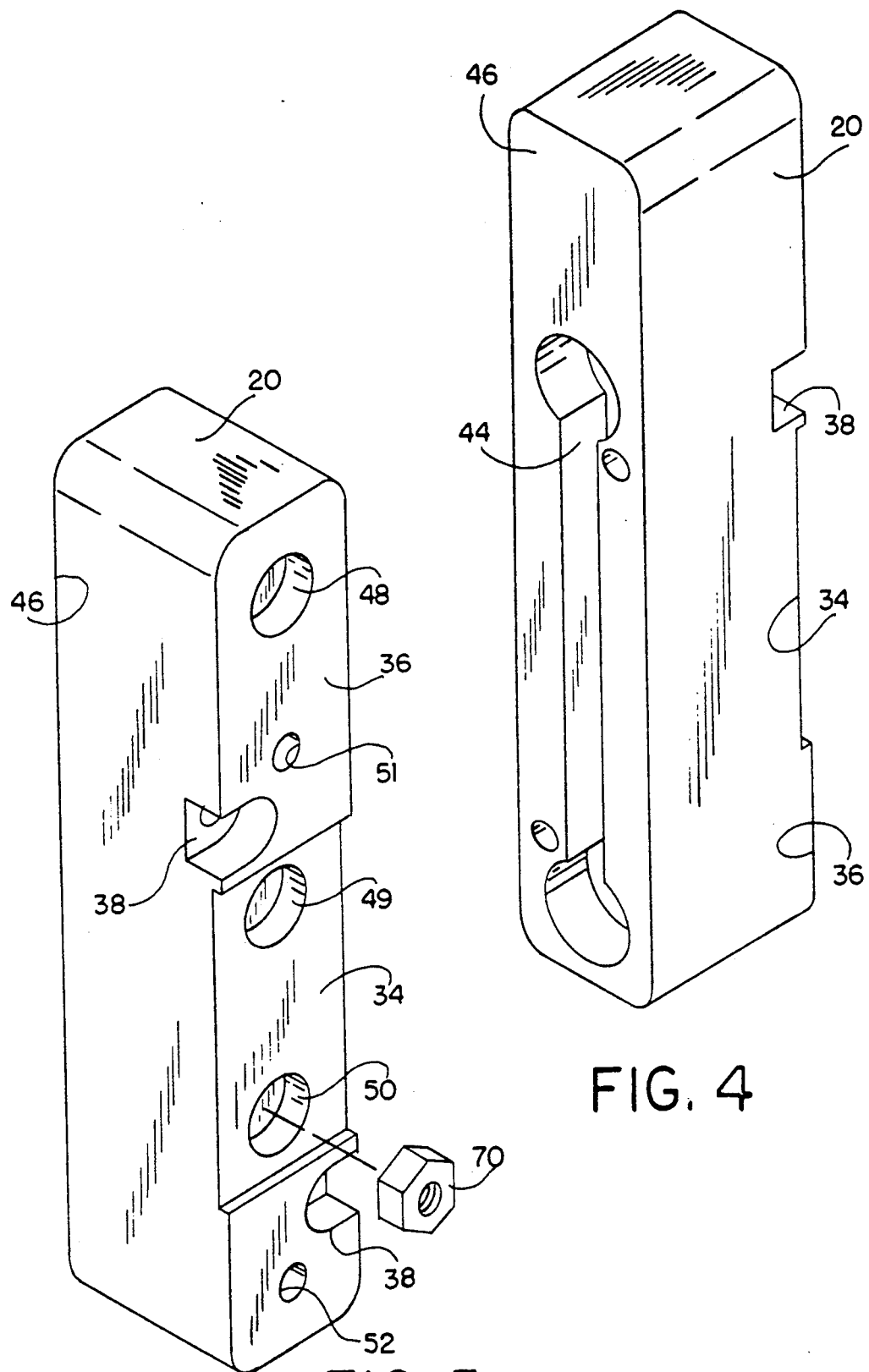
FIG. 3 is an isometric view of the top and side of a mounting block.
FIG. 4 is an isometric view of the bottom and side of the mounting block of FIG. 3; and, FIG. 5 is an elevation view of an individual mounting block fully assembled with surge arrestors, connectors, etc.

Each mounting block 20, as shown in FIGS. 3 and 4, is constructed of a weather resistant material having a high dielectric constant and high impact resistant properties, such as a molded phenolic. The high impact and weather resistant properties of the block 20 promote a low maintenance device with a long service life. The insulative properties of the mounting block 20 prevent electrical discharge between voltage carrying elements, and provide isolation between the line of the signal circuit and ground. To further aid in preventing electrical discharge or inadvertent contact between conductive elements, each block 20 includes a number of recesses and fixed mounting locations to maintain a suitably large isolation gap between conductive elements. For instance, a flat recess 34 in the top face 36 of the block 20 seats the flat grounding plane member 14 in a fixed position below the surge arrestors 24 and circuit lines 22. Counter-bores 38 on either side of the grounding plane recess 34 locate mounting screws 39 below the top surface 36 of the block 20 away from the grounding plane and circuit lines 22.

A dog bone cavity 44 in the bottom surface 46 or molded within the block 20 provides an insulated passage for ungrounded current flow between the line and equipment sides of the device. Further, counter-bores 48, 49, 50, and through-holes 51 and 52 are provided in the top face 36 of the block 20 for securement of the electrical mounting assemblies of the device. These counter-bores 48, 49, 50 and through-holes 51, 52 are spaced sufficiently to prevent electrical discharge through the air gap between them. An internally threaded insert is secured in bores 48, 49, 50 to allow threaded securement with electrical mounting assemblies at these locations. In a molded phenolic, the threaded inserts may be molded in place. Holes 51 and 52 aligned with the ends of cavity 44 accommodate electrical connection with electrical mounting assemblies on the top side 53 of the block 20 and conductive elements in the cavity 44.

Figure 5:
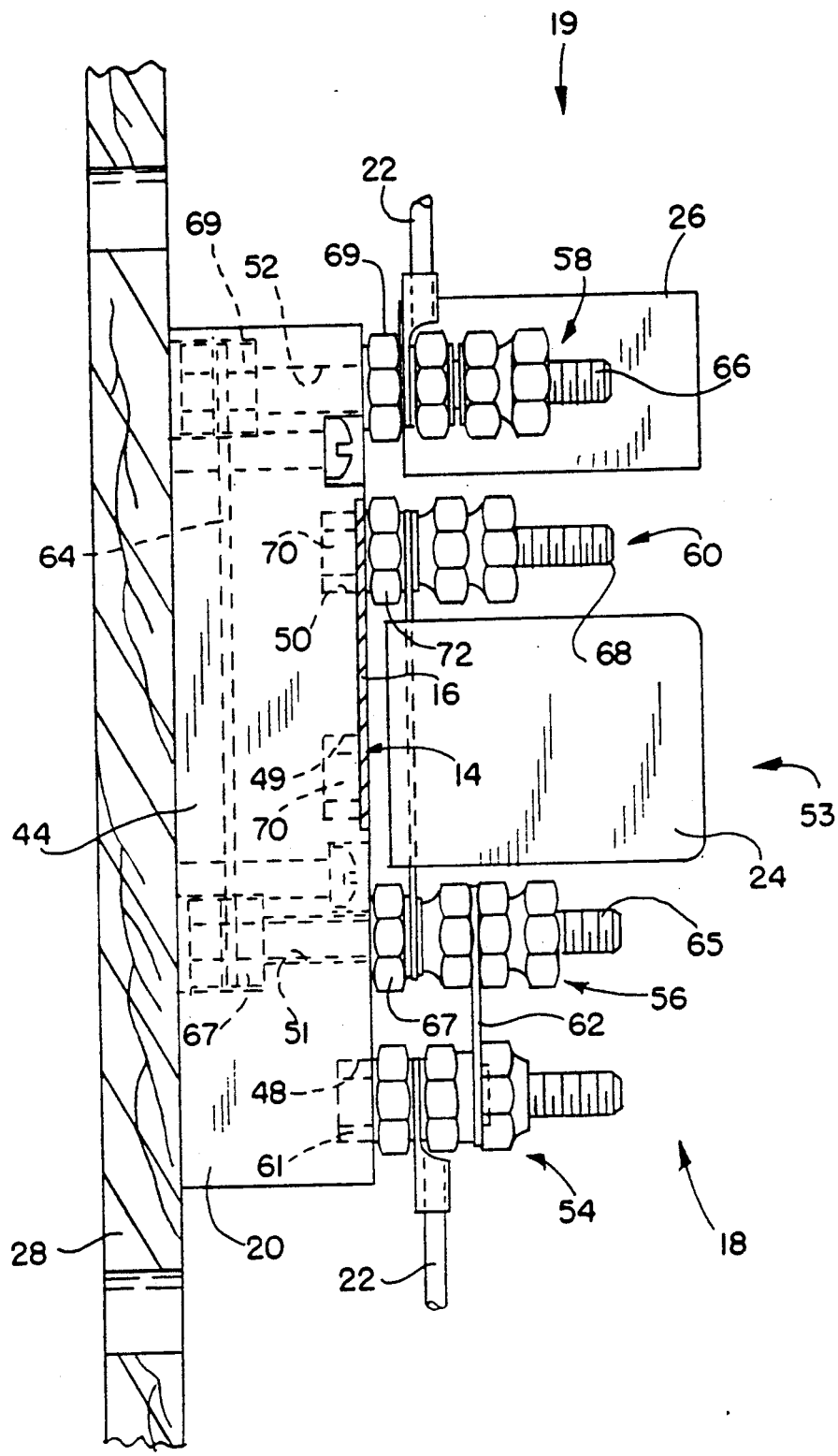

As shown in FIG. 5, the four threaded post and nut electrical mounting assemblies 54, 56, 58, 60 of each mounting block effect the electrical connections between the conductive elements of the surge arresting sub-assembly 12. At the line side 18 of the sub-assembly 12 the circuit line 22 is connected to a line mounting assembly 54 which is in threaded engagement with a threaded insert 61 secured in counter bore 48. The line mounting assembly 54 is connected to a second line mounting assembly 56 via the test link 62. The line mounting assembly 56 includes a threaded post 65 extending through the hole 51 to an end of the cavity 44. Nuts 67 on either end of the hole 51 secure the mounting assembly 56 in place.

In cavity 44 a bus 64 electrically connects the line mounting assembly 56 to the equipment mounting assembly 58. The bus 64 is sized to accommodate at least the equivalent current as can be carried by circuit line 22. The equipment mounting assembly 58 also includes a threaded post 66 extending through the hole 52 in the mounting block 20 and secured in place by nuts 69 at either end of the hole 52. The continuation of the circuit line 22 is then connected to the equipment mounting assembly 58 on the top side 53 of the block 20. A line-to-line surge arrestor 26 may be further connected to the equipment mounting assemblies 59 on adjacent block 20 of the same surge arresting sub-assembly 12 to provide equalizing over-voltage protection between the lines 22 of the same circuit.

Also electrically connected with the line mounting assembly 54 is the surge arrestor 24 which is additionally in electrical connection with the ground mounting assembly 60. Ground mounting assembly 60 includes a threaded post 68 which passes through a hole in the grounding plane 14 to threaded insert 70 secured in counter bore 50 below the plane. The ground mounting assembly 60 is securely electrically connected to the grounding plane 14 with a nut 72 threaded to the post 68 and screwed down tightly against the plane. The surge arrestor 24 is thus electrically connected to mounting assemblies 56, 60 and oriented parallel to and above the grounding plane 14.

Consequently, the line side 18 of the surge arrestor 24 is maintained at the potential voltage of the line side of circuit line 22, while the side of the arrestor connected to ground plane 14 is maintained at the potential voltage of the ground plane.

As noted in FIGS. 2 and 5, each block positions two threaded inserts 70 flush beneath each edge of the member 16 or ground plane 14. In this manner the line sides and equipment sides may be reversed or turned end-for-end as seen in FIG. 5. Also the surge arrestors may be connected from the post 66 to the right hand insert 70 seen in such figure. Both inserts may be utilized in the end blocks 30 to connect posts 74 and 76, to any or all of which ground rod connections may be provided.

While the mounting assemblies and other components are described as being held in place with threaded inserts and nuts secured to the block, it would be apparent to one skilled in the art that many of the nuts, inserts, and components themselves, such as the threaded posts and bus 64, could be molded directly into the block.

In the normal course of operation, an electrical signal passes through the input line 22 to the line mounting assembly 54 and across bus 62 to line mounting assembly 56 where it is conducted through post 65 under the mounting block 20 to the bus 64. The bus 64 then conducts the signal to the equipment mounting assembly 58 where it is conducted back up through the mounting block 20 to the continuation of the circuit line 22 connected to the equipment mounting assembly.

In the event of a voltage surge on the circuit line 22, the surge will be ultimately conducted to the line mounting assembly 56 and the line side 18 of the surge arrestor 24. If the potential voltage difference at the line and ground sides of the arrestor 24 exceeds the rated breakdown voltage of the arrestor, the arrestor will conduct the voltage surge to ground 14. If the voltage potential between the circuit lines of a device 12 exceeds the rated breakdown voltage of arrester 26, the arrester will conduct and short out the lines, thus equalizing the voltage. Sensitive circuit components are thus protected by grounding hazardous voltage surges or equalizing the potential of the circuit.

The arrestors 24, 26 may be of any type available on the market that are of the correct breakdown voltage and rated amperage.

Figure 7:
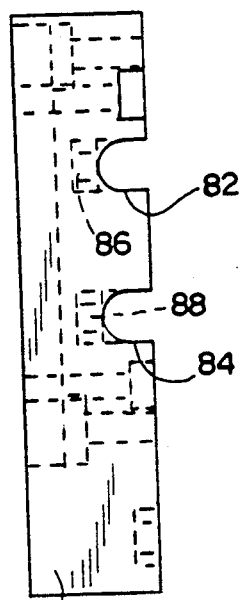
FIG. 7 is an elevation view of the mounting block of FIG. 6.
Figure 6:
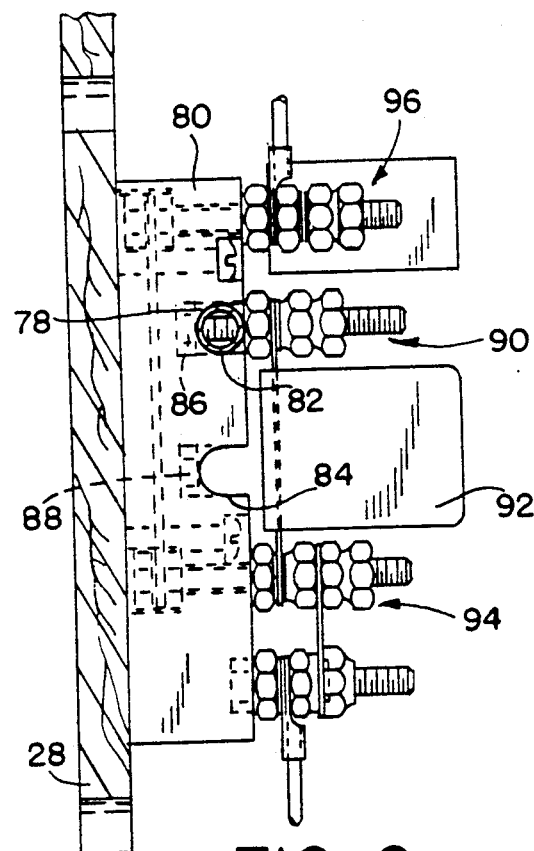
FIG. 6 is an elevation view of an alternate embodiment of a block fully assembled with surge arrestors, connectors, etc.

With reference to FIGS. 6 and 7, an alternate embodiment of the present invention utilizes a tubular grounding member 78. The mounting block 80 has two U-shaped passages 82, 84 into which the tubular member 78 may be received. Threaded inserts 86, 88 are provided at the bottom of each passage 82, 84 to secure a mounting assembly 90. Preferably the tubular member is secured in passage 82 by mounting assembly 90 as shown in FIG. 6, with the arrestor 92 mounted between mounting assemblies 90 and 94. Alternatively, the tubular member 78 and mounting assembly 90 can be secured in passage 84 and the arrester 92 mounted between mounting assemblies 90 and 96.

Figure 8:
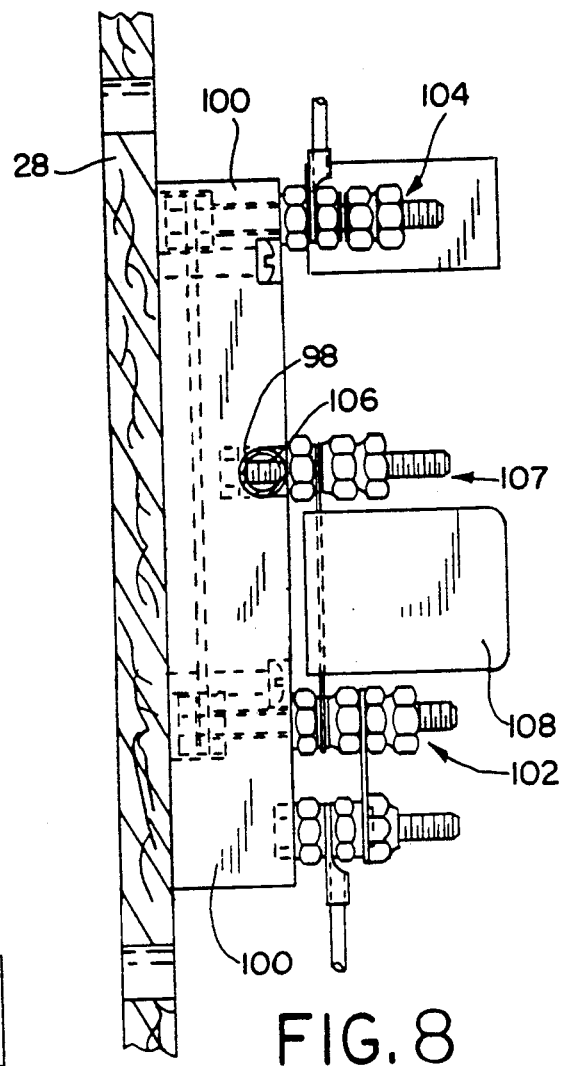
FIG. 8 is an elevation view of another alternate embodiment of a fully assembled mounting block in accordance with the present invention.

Another embodiment of the invention is shown in FIG. 8. In this case one U-shaped passage 98 is located in the mounting block 100 an equal distance between mounting assemblies 102 and 104. A threaded insert recessed in the bottom of the passage 98 secures the tubular member 106 and the mounting assembly 107 in the passage. The arrestor 108 can be mounted between mounting assemblies 102 and 107, as shown, or 104 and 107 without removing or re-orienting the tubular grounding member.

While the above described embodiments illustrate a flat or round tubular grounding member, one skilled in the art would appreciate that any grounding member geometry could be used which has low impedance per unit of length characteristics for both low and high frequency electrical energy transmission. Flat or round tubular geometries are but specific examples of the configurations having the desired characteristics; other configurations include square tubing and Litz wire.

What is claimed is:

1. A device for grounding an electrical surge in a circuit used in a railroad application, comprising:
   a grounding member having a high surface to cross-sectional area ratio for facilitating the low impedance conductance of high frequency electrical energy;
   a plurality of conductors for the conductance of electrical signals from a power source to a load; and,
   a plurality of surge arrestors electrically connected to said conductors and said grounding member for grounding any of such electrical signals to said grounding member when any of such signals exceeds a predetermined voltage.

2. A device as set forth in claim 1, wherein said grounding member is continuously conductive between all surge arrestors mounted thereon.

3. A device as set forth in claim 2, wherein said grounding member is flat.

4. A device as set forth in claim 3, wherein said flat grounding member is in the form of a rectangle.

5. A device as set forth in claim 4, wherein said grounding member is copper.

6. A device as set forth in claim 5, wherein said flat grounding member has a width to thickness ratio of approximately 30 to 1.

7. A device as set forth in claim 2, wherein said grounding member is tubular.

8. A device for grounding surges of electrical energy in circuits used in a railroad application, comprising:
   a continuous conductive loop having a substantially equal impedance to ground at all points on the loop
   a plurality of conductors for the conductance of electrical signals from at least one power source to a plurality of loads; and,
   a plurality of surge arrestors electrically connected to said conductors and said continuous conductive loop for grounding any of such electrical signals to said loop when any of such signals exceeds a predetermined voltage.

9. A device as set forth in claim 8, wherein said continuous conductive loop is in the form of a rectangle.

10. A device as set forth in claim 9, said continuous conductive loop having a high surface to cross-sectional area ratio for facilitating the low impedance conductance of high frequency electrical energy.

11. A device as set forth in claim 10, wherein said continuous conductive loop has long sides sufficiently short to facilitate low impedance conductance of high frequency electrical energy below the resonant frequency of the side.

12. A method of grounding a surge of electrical energy in railroad circuits, comprising the steps of:
   tapping such electrical signal conducted through a circuit;
   electrically coupling such electrical signal to a grounding path when the potential difference between such electrical signal and ground exceeds a predetermined voltage; and,
   conducting such electrical signal to ground along a grounding path having a high surface to cross-sectional area ratio for facilitating the low impedance conductance of high frequency electrical energy.

13. A method as set forth in claim 12, wherein said step of conducting includes conducting such electrical signal along a grounding path in the form of a loop.

14. A mounting block assembly for conductive elements in a railroad circuit surge arrestor sub-assembly, comprising:
   a plurality of highly insulative mounting blocks, each including a top surface having a flat recess for orienting a flat grounding member therein, a bottom surface having a cavity for containing conductive elements, and a plurality of additional recesses located in such top and bottom surfaces maintaining a sufficient air gap between conductive elements mounted therein to prevent electrical discharge between such elements.

15. A mounting block assembly as set forth in claim 14, wherein said mounting blocks are constructed of a resin.

16. A mounting block assembly as set forth in 15 wherein said flat recess is the same depth as the thickness of said flat grounding member.

17. A mounting block assembly as set forth in claim 16 including a threaded insert in said block flush with the top of said flat recess to facilitate electrical connection to said grounding member.

18. A mounting block assembly as set forth claim 17 including two threaded inserts in said block flush with the top of said flat recess to either or both of which such electrical connection can be made.

19. In electrical circuits, a low impedance equipotential grounding plane supported in a recess in a plurality of mounting blocks with a surface exposed for mounting surge arrestors thereto each at a fixed distance with respect to said equipotential plane.

20. A device as set forth in claim 19 wherein said plane is recessed in each mounting block.

21. A device as set forth in claim 20 including a threaded insert in said mounting block to facilitate the connection of a surge arrestor to said plane.

22. A device as set forth in claim 20 wherein said plane is flat.

23. A device as set forth in claim 20 wherein said plane has a high surface to cross sectional area ratio.

24. A device as set forth in claim 20 wherein said plane is tubular.

25. A device as set forth in claim 20 wherein said plane is Litz wire.

* * * * *